United States Patent
Lepo et al.

(10) Patent No.: US 10,781,555 B2
(45) Date of Patent: Sep. 22, 2020

(54) METHOD FOR PRODUCING A SIZING AGENT COMPOSITION, A SIZING AGENT COMPOSITION AND USE THEREOF

(71) Applicant: Kemira Oyj, Helsinki (FI)

(72) Inventors: Anneli Lepo, Tampere (FI); Elsi Turunen, Espoo (FI); Tarja Turkki, Helsinki (FI)

(73) Assignee: Kemira Oyj, Helsinki (FI)

( * ) Notice: Subject to any disclaimer, the term of this patent is extended or adjusted under 35 U.S.C. 154(b) by 100 days.

(21) Appl. No.: 16/064,289

(22) PCT Filed: Dec. 15, 2016

(86) PCT No.: PCT/FI2016/050877
§ 371 (c)(1),
(2) Date: Jun. 20, 2018

(87) PCT Pub. No.: WO2017/109277
PCT Pub. Date: Jun. 29, 2017

(65) Prior Publication Data
US 2019/0003126 A1    Jan. 3, 2019

(30) Foreign Application Priority Data
Dec. 21, 2015 (FI) .................. 20155976

(51) Int. Cl.
| | | |
|---|---|---|
| *D21H 21/16* | (2006.01) | |
| *C08L 3/02* | (2006.01) | |
| *C08L 33/10* | (2006.01) | |
| *C08L 97/00* | (2006.01) | |
| *D21H 19/16* | (2006.01) | |
| *D21H 19/54* | (2006.01) | |
| *D21H 19/58* | (2006.01) | |
| *D21H 17/28* | (2006.01) | |
| *D21H 17/00* | (2006.01) | |
| *D21H 17/23* | (2006.01) | |

(52) U.S. Cl.
CPC ............... *D21H 21/16* (2013.01); *C08L 3/02* (2013.01); *C08L 33/10* (2013.01); *C08L 97/005* (2013.01); *D21H 17/23* (2013.01); *D21H 17/28* (2013.01); *D21H 17/72* (2013.01); *D21H 19/16* (2013.01); *D21H 19/54* (2013.01); *D21H 19/58* (2013.01)

(58) Field of Classification Search
None
See application file for complete search history.

(56) References Cited

U.S. PATENT DOCUMENTS

| | | | |
|---|---|---|---|
| 4,835,212 A | | 5/1989 | Degen et al. |
| 6,103,065 A | * | 8/2000 | Humphreys ............ D21H 23/18 162/158 |
| 6,268,414 B1 | | 7/2001 | Lin |
| 2002/0084045 A1 | | 7/2002 | Collias et al. |
| 2004/0206274 A1 | | 10/2004 | Kruckel |
| 2010/0016478 A1 | | 1/2010 | Brockmeyer et al. |
| 2011/0006491 A1 | | 3/2011 | Andriessen et al. |
| 2013/0184407 A1 | | 7/2013 | Peuranen et al. |
| 2014/0275415 A1 | | 9/2014 | Cimpeanu et al. |
| 2014/0342171 A1 | | 11/2014 | Al-Hellani et al. |

FOREIGN PATENT DOCUMENTS

| | | |
|---|---|---|
| CN | 103806332 A | 5/2014 |
| JP | 2012007283 A | 1/2012 |
| WO | 2016087597 A1 | 6/2016 |

OTHER PUBLICATIONS

Carraher, Jr., Seymour/Carraher's Polymer Chemistry, 4th Ed., Marcel Dekker, Inc., 1996, p. 288 (Year: 1996).*
Finnish Patent Office, Search Report dated Jun. 27, 2016 in FI patent application No. 20155976.

* cited by examiner

*Primary Examiner* — Dennis R Cordray
(74) *Attorney, Agent, or Firm* — Berggren LLP

(57) ABSTRACT

The present invention relates to a sizing agent composition comprising starch, lignosulfonate and poly(alkyl acrylate), poly(alkyl (meth)acrylate), a mixture of poly(alkyl acrylate) and poly(alkyl methacrylate) or a copolymer of alkyl acrylate and alkyl (meth)acrylate. The present invention further relates to a method for preparing the sizing agent composition, and use of the sizing agent composition for sizing paper, paper products or board.

11 Claims, 1 Drawing Sheet

METHOD FOR PRODUCING A SIZING AGENT COMPOSITION, A SIZING AGENT COMPOSITION AND USE THEREOF

PRIORITY

This application is a U.S national application of PCT-application PCT/FI2016/050877 filed on Dec. 15, 2016 and claiming priority of Finnish application FI 20155976 filed on Dec. 21, 2015, the contents of all of which are incorporated herein by reference.

FIELD OF THE INVENTION

The present invention relates a method for preparing a sizing agent composition and to a sizing agent composition. Additionally the present invention relates to use of the sizing agent composition in paper making.

BACKGROUND ART

Sizing makes native fiber network hydrophobic and thus prevents or reduces the penetration of water or other aqueous liquids into the paper. Sizing prevents the spreading and strike through of ink or printing colors. Papermaking fibers have a strong tendency to interact with water. This property is important for the development of strong interfiber hydrogen bonds, especially during drying, and is also the reason why paper loses its strength when rewetted. A high absorbency is important for certain paper grades such as toweling and tissue. Also corrugated medium paper must be able to absorb to a certain degree to convert properly in the corrugating process. On the other hand such properties are disadvantageous for many paper grades, e.g., liquid packaging, top layer of corrugated board, writing and printing papers, and most specialty papers. The water and liquid absorbency can be reduced by addition of sizing agents to the paper stock and/or by their application to the paper surface.

Since the 1950s various forms of rosin size in the form of paste, dispersed, fortified formulations, alkyl ketene dimer (AKD) size, alkenyl succinic anhydride (ASA) size, and polymers mainly based on styrene acrylate and styrene maleate sometimes called polymeric sizing agents (PSAs), have come onto the market. Today, beside starch for paper strength improvement and polymer binders for paper coating, sizing agents are the most important quality-improving additives in the paper manufacturing. New and improved sizing agents and sizing agent compositions are constantly being developed in the field.

For example, U.S. Pat. No. 6,268,414 discloses an aqueous paper sizing composition comprising i) a cellulose-reactive size, ii) a dispersant system comprising sodium lignosulfonate having less than about 5.9 wt % sulfonate sulfur based on the total weight of the sodium lignosulfonate, and iii) at least one of cationic dispersant and non-ionic dispersant, and iv) at least one salt containing at least one metal element.

US 2011/064918, in turn, discloses a sizing-adhesive comprising at least one low molecular weight water soluble polymer having mean molecular weight (Mw) below 200000 Daltons, and wherein the polymer is selected from a polysaccharide, a polysaccharide derivative, sodium lignosulfonate, sodium silicate, polyvinyl alcohol, polyoxyethylene and mixtures of two or more thereof.

Even though there are being developed new sizing agent compositions, there is still a need for even more efficient and cost-efficient sizing agent compositions having improved properties.

SUMMARY OF THE INVENTION

An object of the present invention is to provide a sizing agent composition for use in paper and paper product manufacture.

A further object of the present invention is to provide a sizing agent composition enhancing sizing efficiency.

Yet, a further object of the present invention is to provide a sizing agent composition which is styrene-free.

Yet, another object of the present invention is to provide a sizing agent composition which is more cost-efficient.

Still, one object of the present invention is to provide a simple sizing agent composition. In one embodiment of the invention, the sizing agent composition is free of organic solvents. In another embodiment the sizing agent composition is free of multimers and/or ketene dimers. In another embodiment the sizing agent composition is free of emulsifiers. In another embodiment the sizing agent does not comprise AKD and/or ASA. In one embodiment of the invention the sizing agent composition does not comprise at least one selected from the group consisting of organic solvents, ketene multimers, ketene dimers, emulsifiers, AKD, ASA and/or any combination thereof.

It has now been surprisingly found that when lignosulfonate together with starch is added to poly(alkyl acrylate) or poly(alkyl methacrylate) or to a mixture thereof or to a copolymer of alkyl acrylate and alkyl methacrylate, surface sizing efficiency is improved compared to traditional poly(styrene acrylate) surface sizes. Surprisingly surface sizing efficiency is improved compared to traditional poly(styrene acrylate) surface sizes when a combination of lignosulfonate, starch and at least one selected from the group consisting of poly(alkyl acrylate), poly(alkyl methacrylate), a mixture of poly(alkyl acrylate) and poly(alkyl methacrylate), and a copolymer of alkyl acrylate and alkyl methacrylate. Lignosulfonate can be in protective colloid in the polymerization of alkyl acrylate or alkyl methacrylate or a mixture thereof, or formulated afterwards. Hydrophobation improvement is gained particularly when lignosulfonate is formulated with poly(alkyl acrylate) or poly(alkyl methacrylate) and starch. Especially when poly(tert-butyl acrylate) was combined with lignosulfonate the sizing results were improved significantly.

The lignosulfonate containing compositions were found to have also positive effect on burst strength and SOT. In addition to the technical benefit for improving of sizing, the lignosulfonate-poly(alkyl acrylate) and/or poly(alkyl methacrylate) compositions are more cost-effective since amount of synthetic polymers used in sizing can be reduced without decrease of sizing efficiency. Additionally, the lingosulfonate containing compositions are styrene-free alternative. Using sizing agent compositions comprising the lignosulfonate also reduces ratio of oil-based chemistry compared to poly(styrene-acrylates).

The present invention provides a sizing agent composition.

The present invention further provides a method for preparing a sizing agent composition. The use of the sizing agent composition is depicted, as well.

DETAILED DESCRIPTION

Figure 1:
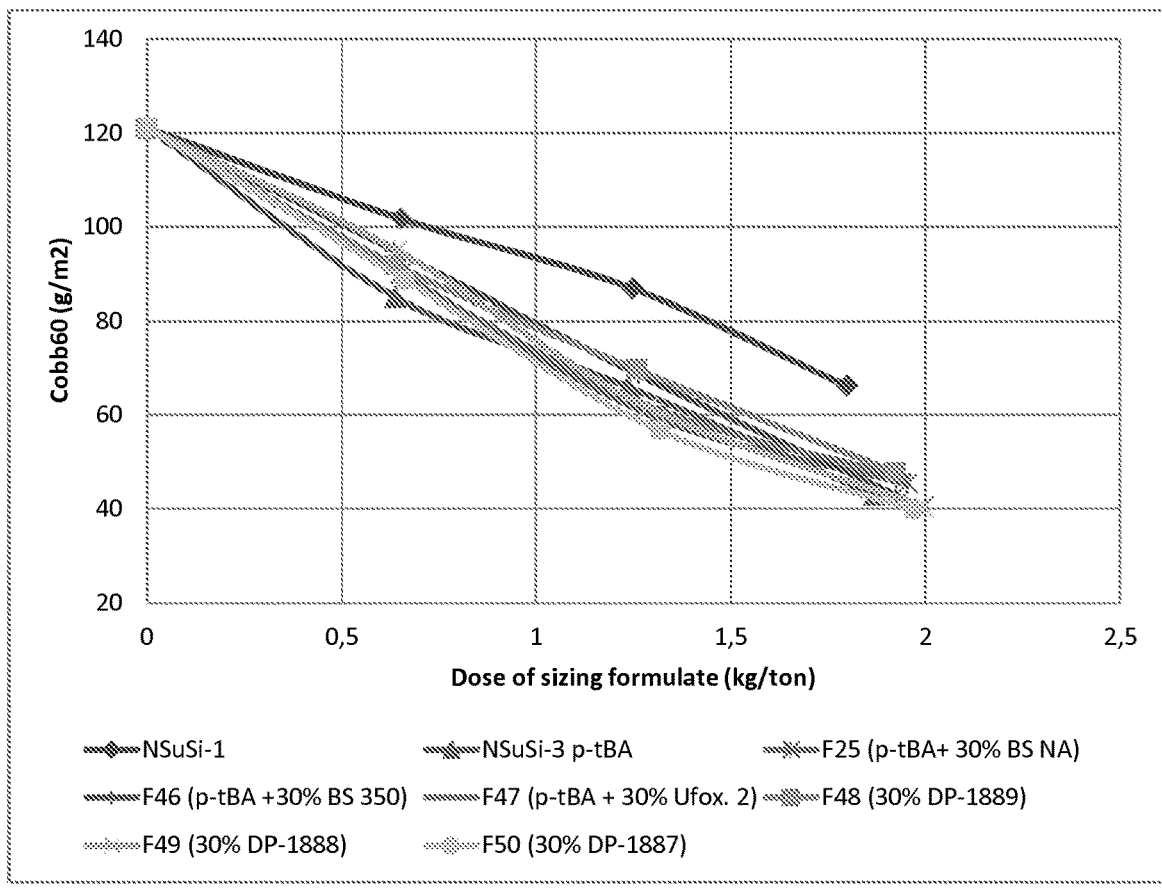
FIG. 1 shows $Cobb_{60}$ values of sizing agent compositions of the present invention compared to reference compositions with different dosages.

According to first aspect of the present invention there is provided a sizing agent composition. More specifically there is provided a sizing agent composition comprising starch, lignosulfonate and poly(alkyl acrylate) or poly(alkyl methacrylate) or a mixture of poly(alkyl acrylate) and poly(alkyl methacrylate) or a copolymer of alkyl acrylate and alkyl methacrylate.

In one embodiment the starch is selected from a group consisting of anionic starch, cationic starch or amphoteric starch. Preferably the starch is anionic starch or cationic, more preferably anionic.

The starch preferably has a molecular weight $M_n$ at most 10000 g/mol. Preferably the molecular weight $M_n$ is from 300 g/mol to 10000 g/mol, more preferably from 500 g/mol to 5000 g/mol. If the molecular weight $M_n$ of the starch is too high, sizing efficiency is reduced because the polymer particles become too large and are not distributed evenly on the paper or board during the sizing.

Amount of the starch in the composition is preferably from 10 to 25 wt. %, more preferably from 15 to 20 wt. % based on total amount of the composition, calculated as dry weight.

In one embodiment, the lignosulfonate has molecular weight Mw below 140000 g/mol, preferably from 1000 g/mol to 60000 g/mol. The sulfonate groups may have charge density (Mutek) of 1.0-3.0 meq/g, preferably 1.25-2.5 meq/g, measured at neutral pH from 0.5 wt. % aqueous solution sample.

Examples of suitable lignosulfonates are sodium lignosulfonate, calcium lignosulfonate, magnesium lignosulfonate and ammonium lignosulfonate, and derivatives thereof such as alkyl derivatives or oxidated forms, or mixtures thereof. Preferably the lignosulfonate is sodium lignosulfonate or its derivative, more preferably sodium lignosulfonate.

The sizing agent composition comprises starch, lignosulfonate and poly(alkyl acrylate) or poly(alkyl methacrylate) or a mixture of poly(alkyl acrylate) and poly(alkyl methacrylate) or a copolymer of alkyl acrylate and alkyl methacrylate.

In one embodiment the sizing agent composition comprises starch, lignosulfonate and poly(alkyl acrylate) or poly(alkyl methacrylate).

Alternatively, in one embodiment the sizing agent composition comprises a mixture of poly(alkyl acrylate) and poly(alkyl methacrylate), starch and lignosulfonate.

Alternatively, in another embodiment the sizing agent composition comprises a copolymer of alkyl acrylate and alkyl methacrylate, starch and lignosulfonate.

In a preferred embodiment the sizing agent composition comprises starch, lignosulfonate and poly(alkyl acrylate).

The poly(alkyl acrylate) is preferably selected from a group consisting of polymers obtainable by free radical copolymerization of at least one ethylenically unsaturated monomer of $C_1$-$C_8$-alkyl acrylate. The alkyl acrylate monomer can be linear or branched. Preferably the alkyl acrylate monomer is branched alkyl acrylate monomer, more preferably tert-butyl acrylate.

The poly(alkyl acrylate) may be linear or branched; preferably the poly(alkyl acrylate) is linear poly(alkyl acrylate) such as poly(tert-butylacrylate) or copolymers of poly(tert-butylacrylate), most preferably poly(tert-butylacrylate).

The poly(alkyl methacrylate) is preferably selected from a group consisting of polymers obtainable by free radical copolymerization of at least one ethylenically unsaturated monomer of $C_1$-$C_8$-alkyl (meth)acrylate. The alkyl (meth)acrylate monomer can be linear or branched. Preferably the alkyl (meth)acrylate monomer is branched alkyl (meth)acrylate monomer, more preferably tert-butyl (meth)acrylate.

The poly(alkyl methacrylate) may be linear or branched, preferably the poly(alkyl methacrylate) is linear poly(alkyl methacrylate) such as poly(tert-butyl methacrylate) or copolymers of poly(tert-butyl methacrylate), most preferably poly(tert-butyl methacrylate).

The copolymer of alkyl acrylate and alkyl methacrylate is preferably a copolymer of, preferably branched, ethylenically unsaturated monomer of $C_1$-$C_8$-alkyl acrylate and, preferably branched, ethylenically unsaturated monomer of $C_1$-$C_8$-alkyl (meth)acrylate, even more preferably a copolymer of tert-butyl acrylate and tert-butyl methacrylate.

Weight ratio of the lignosulfonate to poly(alkyl acrylate) or poly(alkyl methacrylate) or to a mixture of poly(alkyl acrylate) and poly(alkyl methacrylate) or to a copolymer of alkyl acrylate and alkyl methacrylate is from 1:9 to 3:2, preferably from 1:9 to 1:2. If there is too much lignosulfonate compared to poly(alkyl acrylate) or poly(alkyl methacrylate) or to a mixture of poly(alkyl acrylate) and poly(alkyl methacrylate) or to a copolymer of alkyl acrylate and alkyl (meth)acrylate, sizing effect does not last.

The sizing agent composition may be in a form of dispersion, suspension or emulsion. Preferably the sizing agent composition is in a form of dispersion, and most preferably in a form of an aqueous dispersion.

In one embodiment, the sizing agent composition is produced by mixing starch and lignosulfonate with poly(alkyl acrylate) or poly(alkyl methacrylate) or with a mixture of poly(alkyl acrylate) and poly(alkyl (meth)acrylate) or with a copolymer of alkylacrylate and alkyl(meth)acrylate.

In one embodiment, the sizing agent composition is produced by polymerizing alkylacrylate to poly(alkyl acrylate) or alkyl(meth)acrylate to poly(alkyl (meth)acrylate) in the presence of lignosulfonate and starch.

Yet, in other embodiment, the sizing agent composition is produced by polymerizing a mixture of alkyl acrylate and alkyl (meth)acrylate to a copolymer of alkyl acrylate and alkyl (meth)acrylate in the presence of lignosulfonate and starch.

Yet, in other embodiment, the sizing agent composition is produced by i) polymerizing alkylacrylate to poly(alkyl acrylate) in the presence of lignosulfonate and starch, and ii) polymerizing alkyl(meth)acrylate to poly(alkyl (meth)acrylate) in the presence of lignosulfonate and starch, and iii) mixing the products of i) and ii).

Yet, in other embodiment, the sizing agent composition is produced by polymerizing a mixture of alkyl acrylate and alkyl (meth)acrylate to a copolymer of alkyl acrylate and alkyl (meth)acrylate in the presence of starch, and mixing lignosulfonate thereto.

Yet, in other embodiment, the sizing agent composition is produced by i) polymerizing alkylacrylate to poly(alkyl acrylate) in the presence of starch and mixing lignosulfonate thereto, and ii) polymerizing alkyl(meth)acrylate to poly(alkyl (meth)acrylate) in the presence of starch and mixing lignosulfonate thereto, and iii) mixing the products of i) and ii).

In a preferred embodiment, the sizing agent composition is produced by polymerizing alkyl acrylate to poly(alkyl acrylate) or alkyl (meth)acrylate to poly(alkyl (meth)acrylate) in the presence of starch, and mixing lignosulfonate thereto.

In a preferred embodiment the sizing agent composition is free of poly(styrene acrylates).

In another preferred embodiment the sizing agent composition consists of starch, lignosulfonate and poly(alkyl acrylate) or poly(alkyl methacrylate), preferably the sizing agent composition consists of starch, lignosulfonate and poly(alkyl acrylate).

According to second aspect of the present invention there is provided a method for preparing a sizing agent composition. More specifically there is provided a method for preparing a sizing agent composition comprising starch, lignosulfonate and poly(alkyl acrylate) or poly(alkyl (meth)acrylate) or a mixture of poly(alkyl acrylate) and poly(alkyl (meth)acrylate) or a copolymer of alkyl acrylate and alkyl (meth)acrylate.

The method for preparing a sizing agent composition comprising starch, lignosulfonate and poly(alkyl acrylate) or poly(alkyl (meth)acrylate) or a copolymer of alkyl acrylate and alkyl (meth)acrylate or alternatively a mixture of poly(alkyl acrylate) and poly(alkyl (meth)acrylate) comprises (i) providing a mixture comprising starch, lignosulfonate and alkyl acrylate or alkyl (meth)acrylate or a mixture of alkyl acrylate and alkyl (meth)acrylate; and polymerizing the alkylacrylate to poly(alkyl acrylate) or the alkyl(meth)acrylate to poly(alkyl methacrylate) or the mixture of alkyl acrylate and alkyl (meth)acrylate to a copolymer of alkyl acrylate and alkyl (meth)acrylate in the presence of the lignosulfonate and the starch to obtain the sizing agent composition; or (ii) providing a mixture comprising starch and alkylacrylate or alkyl(meth)acrylate or a mixture of alkyl acrylate and alkyl (meth)acrylate; polymerizing the alkylacrylate to poly(alkyl acrylate) or the alkyl(meth)acrylate to poly(alkyl methacrylate) or the mixture of alkyl acrylate and alkyl (meth)acrylate to a copolymer of alkyl acrylate and alkyl (meth)acrylate in the presence of the starch to obtain a mixture comprising starch and poly(alkyl acrylate) or poly(alkyl methacrylate) or the copolymer of alkyl acrylate and alkyl (meth)acrylate; and mixing lignosulfonate with the mixture comprising the starch and the poly(alkyl acrylate) or the poly(alkyl methacrylate) or the copolymer of alkyl acrylate and alkyl (meth)acrylate to obtain the sizing agent composition.

In one embodiment of the method (i) and (ii), starch is first dissolved into water to produce a starch containing aqueous solution preferably at an elevated temperature. The temperature is preferably 70-98° C., more preferably 75-90° C., and even more preferably 80-90° C. such as 85° C. Preferably the starch is dissolved into the water under an inert atmosphere such as under nitrogen atmosphere.

In one embodiment of the method (i), to the starch containing aqueous solution the alkyl acrylate or alkyl (meth)acrylate or a mixture of alkyl acrylate and alkyl (meth)acrylate is fed at the same time with the lignosulfonate. Preferably the lignosulfonate is fed as an aqueous solution. In one embodiment the alkyl acrylate or alkyl (meth)acrylate or a mixture of alkyl acrylate and alkyl (meth)acrylate and the lingnosulfonate are fed over a prolonged period of time, preferably 60-240 min, preferably 100-150 min such as 120 min.

In one embodiment of the method (ii), to the starch containing aqueous solution the alkyl acrylate or alkyl (meth)acrylate or a mixture of alkyl acrylate and alkyl (meth)acrylate is fed. In one embodiment the alkyl acrylate or alkyl (meth)acrylate or a mixture of alkyl acrylate and alkyl (meth)acrylate is fed over a prolonged period of time, preferably 60-240 min, preferably 100-150 min such as 120 min.

The polymerization reaction in (i) and (ii) is preferably conducted at an elevated temperature of 70-98° C., more preferably 75-90° C., and even more preferably 80-90° C. such as 85° C. and optionally under an inert atmosphere such as under nitrogen atmosphere. The polymerization is initiated with any suitable initiator such as hydrogen peroxide.

After the polymerization reaction, in one embodiment, pH of the solution is adjusted to acidic region, preferably to 3-6.5 such as 6.

In one embodiment of the method (i), the resulting solution is filtered.

In one embodiment of the method (ii), a lignosulfonate containing aqueous solution is mixed with the mixture comprising the starch and the poly(alkyl acrylate) or poly(alkyl methacrylate) or the copolymer of alkyl acrylate and alkyl (meth)acrylate. In one embodiment the resulting solution is filtered.

In an alternative embodiment, the composition is produced by a) polymerizing alkylacrylate to poly(alkyl acrylate) in the presence of lignosulfonate and starch, and b) polymerizing alkyl(meth)acrylate to poly(alkyl (meth)acrylate) in the presence of lignosulfonate and starch, and c) mixing the products of a) and b).

Yet, in other alternative embodiment, the sizing agent composition is produced by a) polymerizing alkylacrylate to poly(alkyl acrylate) in the presence of starch and mixing lignosulfonate thereto, and b) polymerizing alkyl(meth)acrylate to poly(alkyl (meth)acrylate) in the presence of starch and mixing lignosulfonate thereto, and c) mixing the products of a) and b).

Yet, in other alternative embodiment, the sizing agent composition is prepared by mixing starch and lignosulfonate with poly(alkyl acrylate) or poly(alkyl methacrylate) or with a mixture of poly(alkyl acrylate) and poly(alkyl methacrylate) or with a copolymer of alkylacrylate and alkyl(meth)acrylate.

In a preferred embodiment, the method for preparing the sizing agent composition comprises providing a mixture comprising starch and alkyl acrylate or alkyl (meth)acrylate, preferably alkylacrylate; polymerizing the alkyl acrylate to poly(alkyl acrylate) or the alkyl (meth)acrylate to poly(alkyl methacrylate), preferably the alkyl acrylate to poly(alkyl acrylate), in the presence of the starch to obtain a mixture comprising starch and poly(alkyl acrylate) or poly(alkyl methacrylate); and mixing lignosulfonate with the mixture comprising the starch and the poly(alkyl acrylate) or the poly(alkyl methacrylate) to obtain the sizing agent composition.

In one embodiment the starch is selected from a group consisting of anionic starch, cationic starch or amphoteric starch. Preferably the starch is anionic starch or cationic, more preferably anionic.

The starch preferably has a molecular weight $M_n$ at most 10000 g/mol. Preferably the molecular weight $M_n$ is from 300 g/mol to 10000 g/mol, more preferably from 500 g/mol to 5000 g/mol. If the molecular weight $M_n$ of the starch is too high, sizing efficiency is reduced because the polymer particles become too large and are not distributed evenly on the paper or board during the sizing.

Amount of the starch in the composition is preferably from 10 to 25 wt. %, more preferably from 15 to 20 wt. % based on total amount of the composition, calculated as dry weight.

In one embodiment, the lignosulfonate has molecular weight Mw below 140000 g/mol, preferably from 1000 g/mol to 60000 g/mol. The sulfonate groups may have charge density (Mutek) of 1.0-3.0 meq/g, preferably 1.25-2.5 meq/g, measured at neutral pH from 0.5 wt. % aqueous solution sample.

Examples of suitable lignosulfonates are sodium lignosulfonate, calcium lignosulfonate, magnesium lignosulfonate and ammonium lignosulfonate, and derivatives thereof such as alkyl derivatives or oxidated forms, or mixtures thereof. Preferably the lignosulfonate is sodium lignosulfonate or its derivative, more preferably sodium lignosulfonate.

The poly(alkyl acrylate) is preferably selected from a group consisting of polymers obtainable by free radical copolymerization of at least one ethylenically unsaturated monomer of $C_1$-$C_8$-alkyl acrylate. The alkyl acrylate monomer can be linear or branched. Preferably the alkyl acrylate monomer is branched alkyl acrylate monomer, more preferably tert-butyl acrylate.

The poly(alkyl acrylate) may be linear or branched; preferably the poly(alkyl acrylate) is linear poly(alkyl acrylate) such as poly(tert-butylacrylate) or copolymers of poly(tert-butylacrylate), most preferably poly(tert-butylacrylate).

The poly(alkyl methacrylate) is preferably selected from a group consisting of polymers obtainable by free radical copolymerization of at least one ethylenically unsaturated monomer of $C_1$-$C_8$-alkyl (meth)acrylate. The alkyl (meth)acrylate monomer can be linear or branched. Preferably the alkyl (meth)acrylate monomer is branched alkyl (meth)acrylate monomer, more preferably tert-butyl (meth)acrylate.

The poly(alkyl methacrylate) may be linear or branched, preferably the poly(alkyl methacrylate) is linear poly(alkyl methacrylate) such as poly(tert-butyl methacrylate) or copolymers of poly(tert-butyl methacrylate), most preferably poly(tert-butyl methacrylate).

The copolymer of alkyl acrylate and alkyl methacrylate is preferably a copolymer of, preferably branched, ethylenically unsaturated monomer of $C_1$-$C_8$-alkyl acrylate and, preferably branched, ethylenically unsaturated monomer of $C_1$-$C_8$-alkyl (meth)acrylate, even more preferably a copolymer of tert-butyl acrylate and tert-butyl methacrylate.

Weight ratio of the lignosulfonate to poly(alkyl acrylate) or poly(alkyl methacrylate) or to a mixture of poly(alkyl acrylate) and poly(alkyl methacrylate) or to a copolymer of alkyl acrylate and alkyl methacrylate is from 1:9 to 3:2, preferably from 1:9 to 1:2. If there is too much lignosulfonate compared to poly(alkyl acrylate) or poly(alkyl methacrylate) or to a mixture of poly(alkyl acrylate) and poly(alkyl methacrylate) or to a copolymer of alkyl acrylate and alkyl (meth)acrylate, sizing effect does not last.

The sizing agent composition may be in a form of dispersion, suspension or emulsion. Preferably the sizing agent composition is in a form of dispersion, and most preferably in a form of an aqueous dispersion.

In a preferred embodiment with the process of the present invention is produced the sizing agent composition of the present invention.

In another preferred embodiment the sizing agent composition of the present invention is produced with the process of the present invention.

According to third aspect of the present invention there is provided a use of a sizing agent composition. More specifically there is provided a use of the sizing agent composition of the present invention or the sizing agent composition prepared with the method of the present invention for sizing paper, paper products or board, preferably liner.

Dosing of the sizing agent composition into surface sizing starch is from 0.1 to 10 kg/t, preferably from 0.5 to 5 kg/t as dry actives.

In fourth aspect of the present invention there is provided a method for producing paper or board, comprising the steps of providing a pulp slurry, dewatering said pulp slurry on a wire, forming a paper or board, and applying the sizing agent composition according to the present invention or the sizing agent composition produced by the process according to the present invention onto the formed paper or board.

In fifth aspect of the present invention there is provided a method for improving surface sizing in production of paper or board, characterized by applying the sizing agent composition according to the present invention or the sizing agent composition produced by the process according to the present invention onto a paper of board.

Hereafter, the present invention is described in more detail and specifically with reference to the examples, which are not intended to limit the present invention.

EXAMPLES

Example 1 According to the Present Invention
(Sample F25; Method (i))

Synthesis of Poly(Tert-Butyl Acrylate) Dispersion with a Starch Protective Colloid 57.25 g of an oxidatively degraded potato starch (Perfectamyl A 4692) was dispersed with stirring in 329 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 28.6 g of 0.66% strength aqueous solution of ferrous (II) sulfate heptahydrate was added in to the reactor. After 10 minutes 3.3 g of 30% strength hydrogen peroxide was added. After 10 minutes, the starch degradation was complete. Then 167.4 g of heated demineralizer water was added to the reactor. After the temperature had stabilized to 85° C., the chemical feeds were started. 167.4 g of tert-butyl acrylate was fed during 120 minutes. 48.8 g of 3% solution of hydrogen peroxide was fed simultaneously with the monomer feed during 120 min. The reactor temperature was kept at 85° C. during the feeds and 15 minutes after for postpolymerization. Then the mixture was cooled to 60° C. and 5.2 g of 11.7% strength tert-butyl hydroperoxide solution was added dropwise into the reactor. The temperature was kept at 60° C. for further 60 min. Thereafter, cooling was effected to 40° C. and 5.9 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 μm filter cloth. A finely divided dispersion with a solids content of 26.3% is obtained.

Mixing with Lignosulfonate

Then a 30% lignosulfonate (Borresperse NA) was prepared in deionized water by mixing water with Borresperse NA in a Schott bottle until all was dissolved. Then 36.5 g of the poly(tert-butyl acrylate) dispersion and 13.8 g of 30% lignosulfonate solution were weighed in a 100 ml Schott bottle and stirred with a magnetic stirrer for 15 minutes at room temperature. The resulting mixture is a brown dispersion. Then solids content of the dispersion is 27.3% and pH is 6.3.

Example 2 According to the Present Invention (Sample F46; Method (ii))

The product in example 2 was prepared using the same procedure as in Example 1, but 21.8 g of the same polymeric dispersion and 8.4 g of 30% solution prepared from Borresperse 350 (lignosulfonate) and deionized water were used instead. The resulting mixture is a gray dispersion. Then solids content of the dispersion is 27.1% and pH is 5.3.

Example 3 According to the Present Invention (Sample F47; Method (ii))

The product in example 3 was prepared using the same procedure as in Example 1, 21.8 g of the same polymeric dispersion and 8.3 g of 30% solution prepared from Ufoxane 2 (lignosulfonate) and deionized water were used instead. The resulting mixture is a brown dispersion. Then solids content of the dispersion is 27.2% and pH is 8.9.

Example 4 According to the Present Invention (Sample F48; Method (ii))

The product in example 4 was prepared using the same procedure as in Example 1, but 21.8 g of the same polymeric dispersion and 8.2 g of 30% solution prepared from DP-1889 (lignosulfonate) and deionized water were used instead. The resulting mixture is a brown dispersion. Then solids content of the dispersion is 27.3% and pH is 6.7.

Example 5 According to the Present Invention (Sample F49; Method (ii))

The product in example 5 was prepared using the same procedure as in Example 1, but 21.8 g of the same polymeric dispersion and 8.3 g of 30% solution prepared from DP-1888 (lignosulfonate) and deionized water were used instead. The resulting mixture is a brown dispersion. Then solids content of the dispersion is 27.2% and pH is 6.6.

Example 6 According to the Present Invention (Sample F50; Method (ii))

The product in example 6 was prepared using the same procedure as in Example 1, but 21.8 g of the same polymeric dispersion and 8.3 g of 30% solution prepared from DP-1887 (lignosulfonate) and deionized water were used instead. The resulting mixture is a brown dispersion. Then solids content of the dispersion is 27.2% % and pH is 8.7.

Example 7 According to the Present Invention (Sample F26; Method (ii))

The product in example 7 was prepared using the same procedure as in Example 1, but 45.5 g of the same polymeric dispersion and 4.5 g of 30% solution prepared from Borresperse NA (lignosulfonate) and deionized water were used instead. The resulting mixture is a brown dispersion. Then solids content of the dispersion is 26.8% and pH is 5.7.

Example 8 According to the Present Invention (Sample NSuSi-164; Method (i))

45.86 g of an oxidatively degraded potato starch (Perfectamyl A 4692) was dispersed with stirring in 264 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 22.9 g of 0.66% strength aqueous solution of ferrous (II) sulfate heptahydrate was added in to the reactor. After 10 minutes 2.7 g of 30% strength hydrogen peroxide was added. After 10 minutes, the starch degradation was complete. Then 134.1 g of heated demineralizer water was added to the reactor. After the temperature had stabilized to 85° C., the chemical feeds were started. 134.1 g of tert-butyl acrylate was fed during 120 minutes. 39.1 g of 3% solution of hydrogen peroxide was fed simultaneously with the monomer feed during 120 min. Lignosulfonate feed—of 10% Borresperse NA in water—was started 75 minutes after the other feeds were started and stopped simultaneously with the other feeds. The reactor temperature was kept at 85° C. during the feeds and 15 minutes after for postpolymerization. Then the mixture was cooled to 60° C. and 4.1 g of 11.7% strength tert-butyl hydroperoxide solution was added dropwise into the reactor. The temperature was kept at 60° C. for further 60 min. Thereafter, cooling was effected to 40° C. and 4.7 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 μm filter cloth. A finely divided dispersion with a solids content of 27.4% is obtained.

$Cobb_{60}$ Measurements

The sizing agent compositions and formulates were tested for the surface size application using an internally unsized, recycled fiber linerboards with base weight of ca. 120 and 100 g/m$^2$. Mathis size presses were used in these tests. The sizing agent composition was added to surface size starch (C*film 07311) solution at 15% reference to base weight 120 g/m$^2$ or test series for samples F25, F26, F46, F47, F48, F49, F50. Hydrophobic polymers were added at concentrations of 1.5, 3.0 and 4.5 weight-%. Sizing tests were carried out at 70° C. temperature. Temperature of the size press nip was measured with Reatec NO1 temperature indicator strips and temperature of the water bath for size press rolls was adjusted to obtain the desired temperature. The sheets were run through a horizontal pond size press at 2 m/min (2 Bar). The sheets were dried at 95° C. 1 min/side either using a contact dryer or a drum dryer. Temperature of the dryers was adjusted using Reatec NO82 temperature indicator strips. The sizing efficiency was determined by measuring Cobb60 sizing degree according to standard ISO 535.

Results

Figure 2:
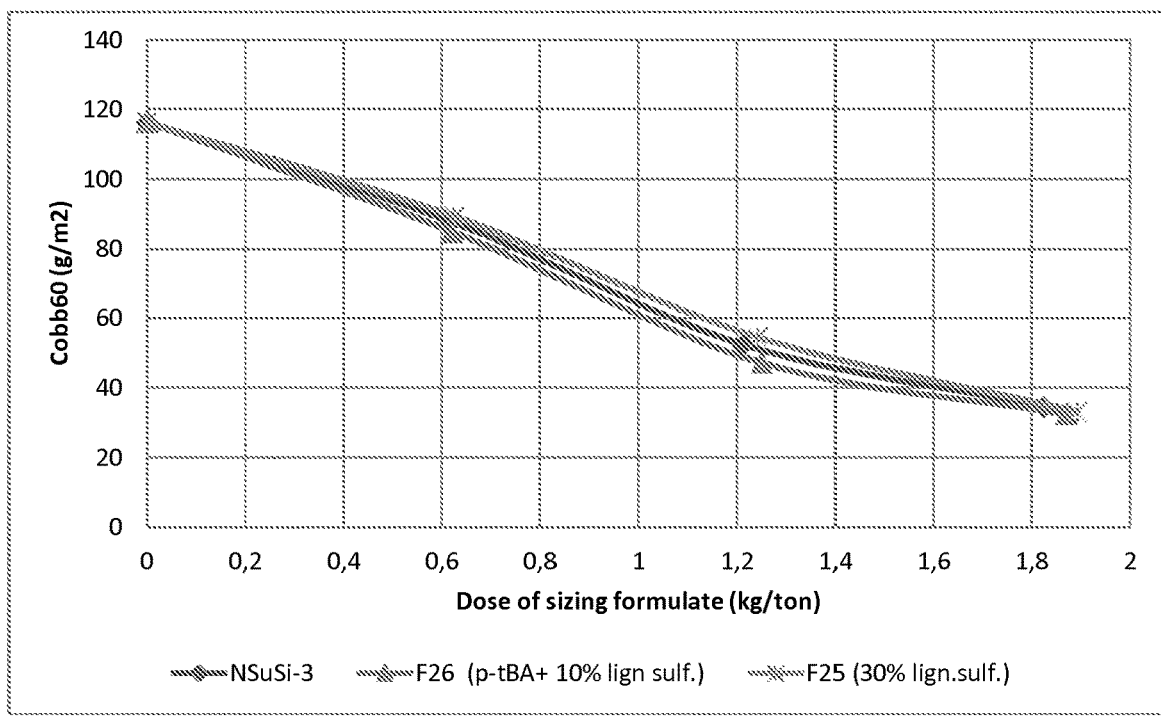
FIG. 2 shows $Cobb_{60}$ values of sizing agent compositions of the present invention compared to reference compositions with different dosages.

As can be seen from FIG. 1, the sizing agent compositions of the present invention present improved (or same) sizing results (Cobb60 values) as the reference samples. That is, replacing some of the synthetic polymer in sizing agent compositions with lignosulfonate improves sizing or at least give same sizing results as synthetic polymer sizing agent compositions. This is also supported by the results of FIG. 2.

In the Figures samples F25, F26, F46, F47, F48, F49, F50 are sizing agent composition of the present invention produced with the method of the present invention (shown in the Examples above).

Sample NSuSi3 p-tBA (reference sample) is a starch-poly (tert-butyl acrylate) sizing agent produced with same method as the first step in Example 1 (that is, without any lignosulfonate addition).

Sample NSuSi-1 (reference sample) is a synthetic sizing agent containing a copolymer of styrene, n-butyl acrylate and t-butyl acrylate having weight ratio of monomers 50:25:25.

Sample NSuSi-3 (reference sample) is a starch based sizing agent.

The invention claimed is:

1. A sizing agent composition comprising starch, lignosulfonate and poly(alkyl acrylate) or poly(alkyl methacrylate) or a mixture of poly(alkyl acrylate) and poly(alkyl methacrylate) or a copolymer of alkyl acrylate and alkyl methacrylate,
   wherein the starch has a molecular weight $M_n$ of at most 10000 g/mol and an amount of the starch is from 10 to 25 wt. % based on a total amount of the composition, of dry weight,
   wherein a weight ratio of the lignosulfonate to the poly (alkyl acrylate) or the poly(alkyl methacrylate) or to a mixture of poly(alkyl acrylate) and poly(alkyl methacrylate) or to a copolymer of alkyl acrylate and alkyl methacrylate is from 1:9 to 3:2, and
   wherein the sizing agent composition is free of poly (styreneacrylates), and the sizing agent composition does not comprise an alkyl ketene dimer (AKD) and/or an alkenyl succinic anhydride (ASA).

2. The sizing agent composition according to claim 1, wherein the starch is anionic starch, cationic starch or amphoteric starch.

3. The sizing agent composition according to claim 1, wherein the starch has a molecular weight $M_n$ from 300 g/mol to 10000 g/mol.

4. The sizing agent composition according to claim 1, wherein the poly(alkyl acrylate) is selected from a group consisting of polymers obtainable by free radical copolymerization of at least one ethylenically unsaturated monomer of $C_1$-$C_8$-alkyl acrylate; and
   the poly(alkyl methacrylate) is selected from a group consisting of polymers obtainable by free radical copolymerization of at least one ethylenically unsaturated monomer of $C_1$-$C_8$-alkyl (meth)acrylate.

5. The sizing agent composition according to claim 1, wherein the copolymer of alkyl acrylate and alkyl methacrylate is a copolymer of ethylenically unsaturated monomer of $C_1$-$C_8$-alkyl acrylate and ethylenically unsaturated monomer of $C_1$-$C_8$-alkyl (meth)acrylate.

6. The sizing agent composition according to claim 1, wherein the weight ratio of the lignosulfonate to the poly (alkyl acrylate) or the poly(alkyl methacrylate) or to the mixture of poly(alkyl acrylate) and poly(alkyl methacrylate) or to the copolymer of alkyl acrylate and alkyl methacrylate is from 1:9 to 1:2.

7. The sizing agent composition according to claim 1, wherein the sizing agent composition is in a form of an aqueous dispersion.

8. A method for preparing a sizing agent composition comprising starch, lignosulfonate and poly(alkyl acrylate) or poly(alkyl (meth)acrylate) or a copolymer of alkyl acrylate and alkyl (meth)acrylate or a mixture of poly(alkyl acrylate) and poly(alkyl (meth)acrylate), said method comprising:
   (i) providing a mixture comprising starch, lignosulfonate and alkyl acrylate or alkyl (meth)acrylate or a mixture of alkyl acrylate and alkyl (meth)acrylate and an amount of the starch is from 10 to 25 wt. % based on a total amount of the composition, of dry weight; and
   polymerizing the alkylacrylate to poly(alkyl acrylate) or the alkyl(meth)acrylate to poly(alkyl methacrylate) or the mixture of alkyl acrylate and alkyl (meth)acrylate to a copolymer of alkyl acrylate and alkyl (meth)acrylate in the presence of the lignosulfonate and the starch to obtain the sizing agent composition; or
   (ii) providing a mixture comprising starch and alkylacrylate or alkyl(meth)acrylate or a mixture of alkyl acrylate and alkyl (meth)acrylate;
   polymerizing the alkylacrylate to poly(alkyl acrylate) or the alkyl(meth)acrylate to poly(alkyl methacrylate) or the mixture of alkyl acrylate and alkyl (meth)acrylate to a copolymer of alkyl acrylate and alkyl (meth)acrylate in the presence of the starch to obtain a mixture comprising starch and poly(alkyl acrylate) or poly (alkyl methacrylate) or the copolymer of alkyl acrylate and alkyl (meth)acrylate; and
   mixing lignosulfonate with the mixture comprising the starch and the poly(alkyl acrylate) or the poly(alkyl methacrylate) or the copolymer of alkyl acrylate and alkyl (meth)acrylate to obtain the sizing agent composition,
   wherein the sizing agent composition is free of poly (styreneacrylates), and the sizing agent composition does not comprise an alkyl ketene dimer (AKS) and/or an alkenyl succinic anhydride (ASA).

9. The method according to claim 8, wherein the polymerization reaction is conducted at a temperature of 70-98° C.

10. The method according to claim 8, wherein the polymerization reaction is conducted under an inert atmosphere.

11. A method for producing paper or board, comprising the steps of providing a pulp slurry, dewatering said pulp slurry on a wire, forming a paper or board and applying the sizing agent composition according to claim 1.

* * * * *